United States Patent [19]
Rogers

[11] 3,959,544
[45] May 25, 1976

[54] FILAMENTARY TAPE CONSTRUCTIONS AND METHODS

[76] Inventor: Charles W. Rogers, 112 W. Jessamine, Fort Worth, Tex. 76110

[22] Filed: Dec. 26, 1973

[21] Appl. No.: 427,455

[52] U.S. Cl............................... 428/109; 428/124; 428/189; 428/222; 428/294; 428/902
[51] Int. Cl.²........................................... B32B 5/12
[58] Field of Search ................... 161/55, 57, 58, 59, 161/99, 100, 101, 102, 104, 120, 125, 140, 145, 152, 47, 60; 428/101, 107, 109, 110, 112, 124, 126, 189, 222, 268, 273, 294

[56] References Cited
UNITED STATES PATENTS

| | | | |
|---|---|---|---|
| 3,150,792 | 9/1964 | Bright | 161/55 |
| 3,243,338 | 3/1966 | Jackson | 161/47 |
| 3,623,928 | 11/1971 | Wincklhofer et al. | 156/306 |
| 3,654,050 | 4/1972 | Frazer | 161/47 |
| 3,682,755 | 8/1972 | Lee | 161/60 |
| 3,700,535 | 10/1972 | McCoy et al. | 161/58 |
| 3,726,751 | 4/1973 | Casadevall | 161/58 |
| 3,767,499 | 10/1973 | Koss | 161/57 |
| 3,768,760 | 10/1973 | Jensen | 161/55 |
| 3,810,803 | 5/1974 | Karp et al. | 161/59 |

*Primary Examiner*—William J. Van Balen
*Assistant Examiner*—William R. Dixon, Jr.
*Attorney, Agent, or Firm*—Wofford, Felsman, Fails & Zobal

[57] ABSTRACT

Following is disclosed structural apparatus and methods of construction of plied filamentary tape including a first ply of impregnated, unidirectional fibers extending along the longitudinal axis of the structural member to form a truss cap. Overlying the first ply are second and third angle plies having fibers transverse to each other and oblique relative to those of the first ply. Portions of the second and third plies may be folded transversely to the plane of the first ply to form one or more shear webs of selected geometry. A portion of each shear web consists of an excess width of ply for attachment to another structural member. The impregnation matrix bonds the plies to each other and to another structural member to form a selected structure. A cart structure embodying the principles of the invention is also disclosed.

4 Claims, 11 Drawing Figures

U.S. Patent    May 25, 1976    Sheet 1 of 3    3,959,544
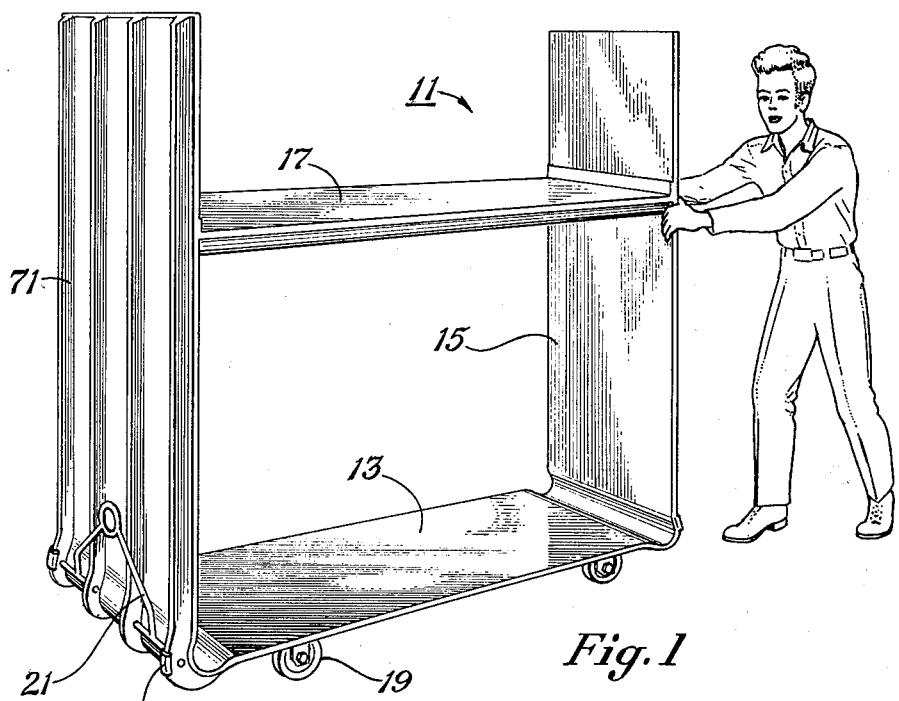
Fig.1
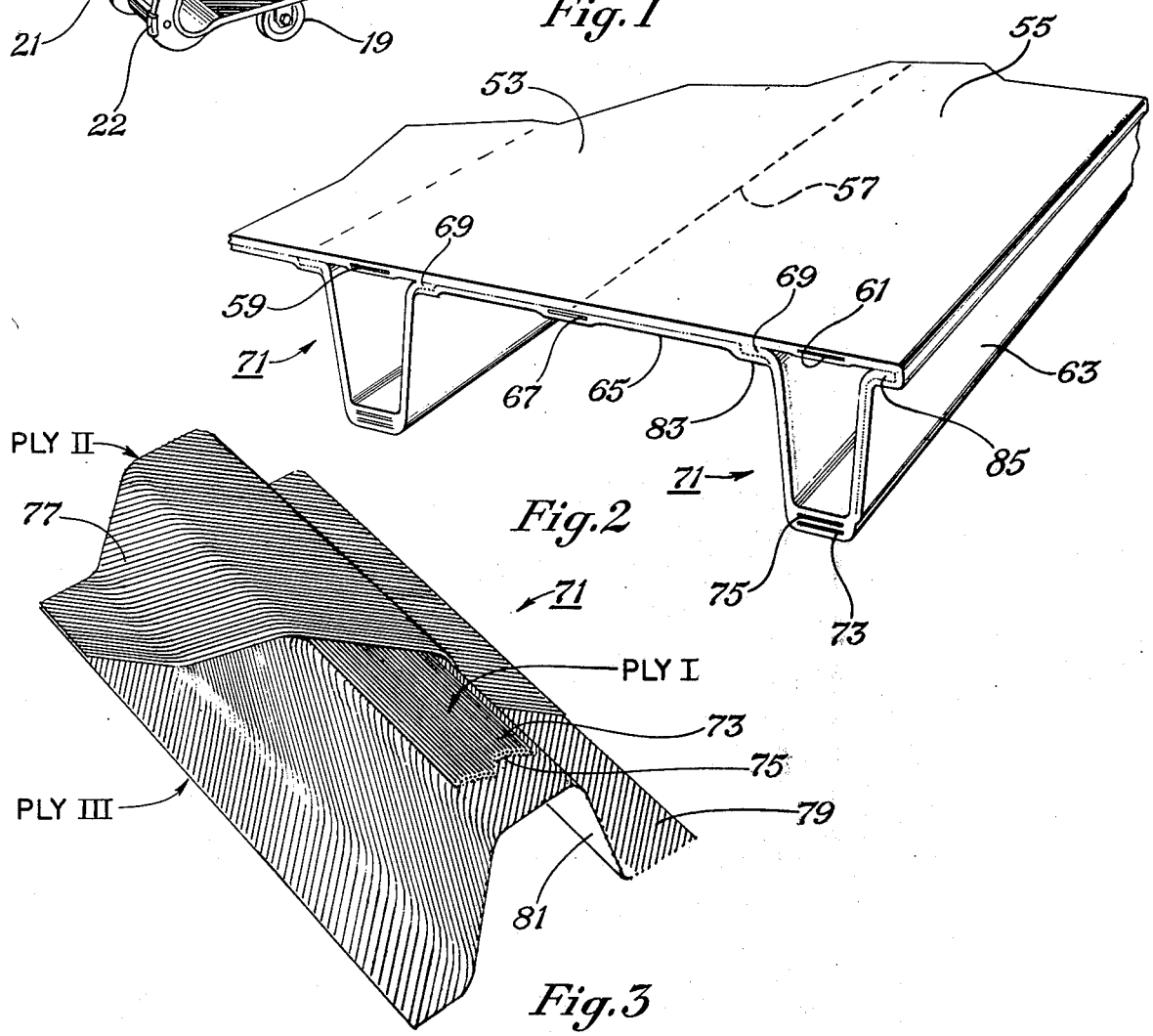
Fig.2
Fig.3

FILAMENTARY TAPE CONSTRUCTIONS AND METHODS

BACKGROUND OF THE INVENTION

1. Field of the Invention

This invention relates in general to structural members, formed of tape, and to a particular form of plied filamentary tape bonded with a matrix in a selected geometric form.

2. Description of the Prior Art

Filamentary tape such as fiberglass in a suitable matrix has long been used to form structural members of relatively high strength and light weight. It is known that strength may be increased through utilization of multiple plies of such material wherein the fibers of each ply are transversely arranged relative to those of another ply.

One of the problems of such prior art structures arises when bending such tapes to form various structural geometries. Axially extending, unidirectional fibers will form to contour only by simple bending, and then only at large or gentle radii because the fibers will not allow local elongation or contraction. It is only the oblique or angle ply material that will elongate or contract easily by parollelograming to a different angle during placement prior to curing the impregnation matrix. some prior art filamentary tapes included unidirectional and angle plies of the same width in the same tape. Forming such tapes to complex contours without wrinkling or fiber damage was not possible.

SUMMARY OF THE INVENTION

This invention is directed to plied filamentary tapes, some of which have fibers extending axially and unidirectionally for curing in an impregnation matrix to form a truss cap in a structural member. Other angle plies of widths greater than the unidirectional plies are included in the tape and have fibers that transversely overlie each other and obliquely overlie the fibers of the first ply. These angle plies are easily contoured and then their impregnation matrix cured to form shear webs. Generally there is an excess width of each angle ply for attachment to another structural member. Hence, the truss cap provides high strength in compression and in tension, while the shear webs support shear and torsional loading. The tape is wrapped by a method disclosed in the following description and includes the steps of aligning along a mandrel, multiple strands of unidirectional fibers, wrapping the mandrel obliquely with multiple strands of fiber, and wrapping the mandrel obliquely with other strands of fibers and in a direction transverse to the first oblique strands.

The above as well as other objects, features and advantages of the invention will become more fully apparent in the following description. For example, a specific structure in the form of a cart will be disclosed.

BRIEF DESCRIPTION OF THE DRAWING

FIG. 1 in the drawing is a perspective view of a portable warehouse cart constructed in accordance with the principles of the invention.

FIG. 2 is a fragmentary perspective view of a portion of the structure shown in FIG. 1.

FIG. 3 is an enlarged perspective view of a single piece of tape of longitudinal and angle piles shaped to form a truss cap and shear webs used in the container shown in FIGS. 1 and 2.

DESCRIPTION OF THE PREFERRED EMBODIMENTS

Figure 4:
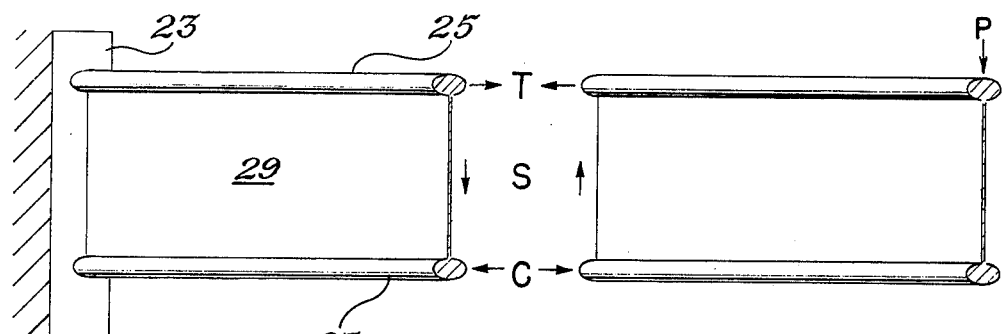
FIG. 4 is an oblique view as seen from one corner of a simple, sectioned prior art beam consisting of an axial member and a shear member.

The numeral 11 in the drawing designates a warehouse cart having a floor 13 and end walls 15 to support a shelf 17, all of which are constructed in accordance with the principles of the invention. In this instance the cart has manual portability through utilization of a plurality of wheels 19 and is equipped with a folding towbar 21 and resilient bumpers 22. Such a cart has, when constructed as explained hereinafter, an extremely high strength-to-weight ratio, higher for example than a cart of similar capacity constructed of steel, magnesium or aluminum.

By way of background, FIG. 4 illustrates a prior art, cantilevered beam of simple construction, extending from a wall 23. This beam has upper and lower axial members 25, 27 in addition to a plate type shear member 29. Hence, the load P generates tension T in upper axial member 25, compression C in lower axial member 27 and shear S in shear member 29.

Figure 5:
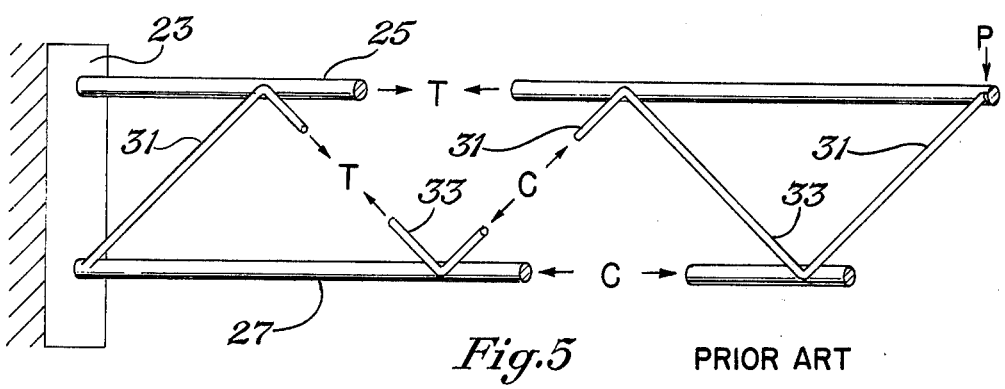
FIG. 5 is a oblique view in partial section as seen from one corner of a simple, sectioned prior art "Warren" truss in which the shear member is replaced by axial members.

A more complex structural member, sometimes called a "Warren" truss, is illustrated in FIG. 5. This structure is cantilevered from the wall 23, has upper and lower axial members 25, 27, but instead of a plate type shear member has a plurality of oblique or diagonal members 31, 33. Here the load P generates tension T in upper axial member 25, compression C in lower axial member 25, tension T in oblique members 33 and compression C in oblique members 31.

Figure 6:
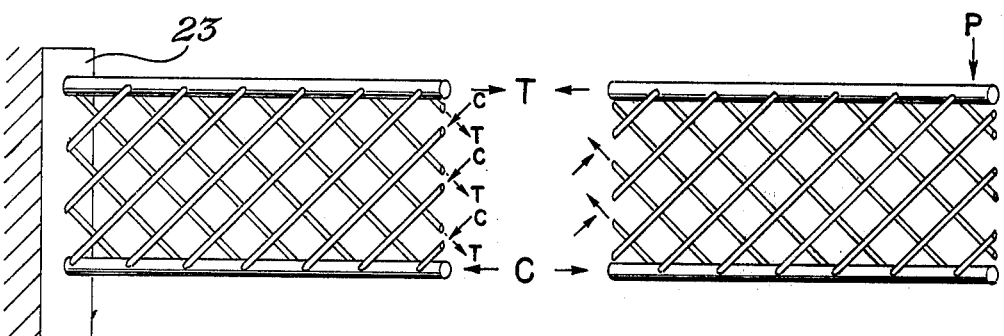
FIG. 6 is an oblique view in partial section illustrating that the diagonal members of a "Warren" truss need not be located precisely at the juncture of opposing truss members.

FIG. 6 illustrates a truss cantilevered from the wall 23, with a structure similar to that of FIG. 5 except a large number of diagonal members 31, 33 are included, the ends of which do not intersect. This lack of intersection is not detrimental if there are a large number of such oblique or diagonal members. This principle is utilized to advantage in the invention as will be apparent hereafter, initially with respect to FIG. 7.

Figure 7:
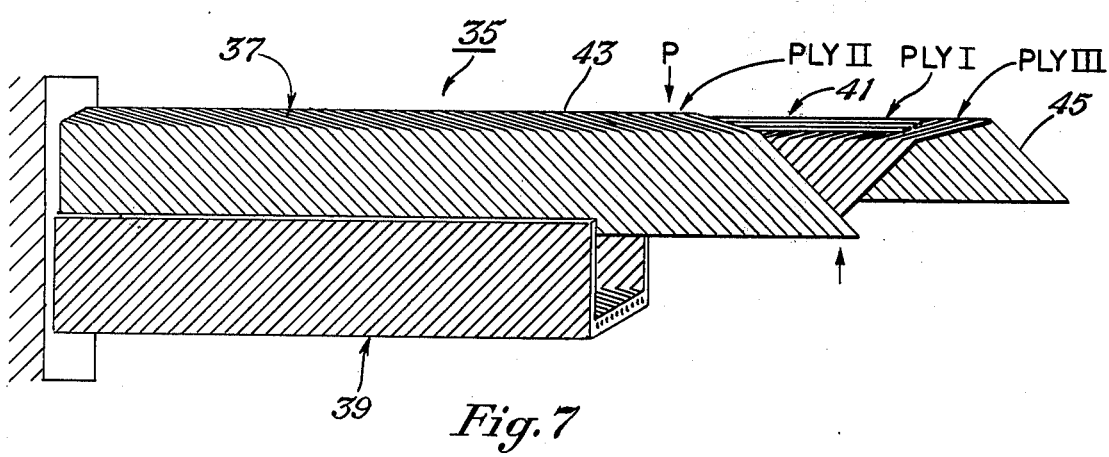
FIG. 7 is a fragmentary perspective and partially sectioned view of a beam constructed in accordance with the principles of the present invention.

In FIG. 7 a beam 35, cantilevered from the wall 23 is formed of an upper and a lower structural member 37, 39. Each structural member utilizes plied filamentary tape, preferably of the class of fibreglass, graphite and boron impregnated with a matrix suitable for structural uses, such as a resin of epoxy or polyester. The subclass of fibreglass and graphite are more common in structural uses because of better commercial availability. For more information about these fibers from which the tape of the present invention may be formed reference is made to *Journal of Composite Materials*, Vol. 6, April, 1972, pp. 208–231.

Each of the upper and lower structural members 37, 39 shown in FIG. 7 has at least three plies. Ply I, designated also by the numeral 41, has unidirectional fibers extending longitudinally or axially relative to the beam 35, being held in alignment with a suitable matrix. Such an arrangement of fibers and matrix after curing forms a truss cap.

Ply II, designated also by the numeral 43, has originally unidirectional fibers layed obliquely relative to the fibers of ply I to form an angle or shear ply.

Ply III, also designated by the numeral 45, is of the same general construction, but has fibers obliquely oriented relative to the fibers of ply I and transversely oriented relative to those of ply II. Preferably the fibers of plies II and III are perpendicular to each other and form approximately a 45° angle with the fibers of ply I.

Upon curing the matrix of the previously described plies employed in forming the members 37 and 39 of FIG. 7, beams of the general form shown in FIG. 6 are obtained. In members 37 and 39, ply I forms an ideal, high strength cap type truss member, while the oblique or angle plies II and III from two shear web members, having been folded transversely to the surface of the first ply 41 as illustrated. Thus it may be seen that plies II and III have widths greater than the width of ply I, portions of which may be used as overlap strips for attachment to another structural member such a lower member 39 in FIG. 7.

As described above, the structural member is therefore formed by a method which utilizes an initial step of aligning an array of longitudinally extending, unidirectional fibers into an elongated first ply to form a truss cap. Then a second ply of these fibers is formed obliquely around, and to a width greater than, the first ply. Next a third ply is formed around the first and second plies to be oblique to fibers of the first ply and transverse to those of the second ply. Portions of the second and third plies are folded transversely with respect to the surface of the first ply to form shear webs. This process is repeated to achieve a selected thickness of fibers and precured matrix. Finally, the plies are cured or bonded such that their matrixes and fibers form a unitary structural member.

Figure 11:
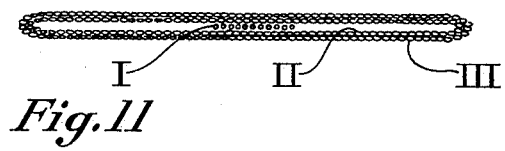
FIG. 11 is a cross-sectional view of one embodiment of the tape of the present invention as seen in a plane transverse to the length of the tape.

An example of one method for manufacturing a filamentary tape is as follows:

Multiple strands of fiberglass of approximately 1/32 inch in diameter are withdrawn from a suitable storage spool and aligned abreast in parallel relationship to form a ribbon or ply of unidirectional fibers approximately 1 inch wide, with a thickness equal to the diameter of an individual strand. This unidirectional ribbon or ply is layed along the length of a mandrel having a circumference of about 16 inches. Multiple such ribbons may be aligned and stacked upon each other to produce a selected thickness. The mandrel is then wrapped with another similar or first angle ribbon of the same fibers obliquely around the circumference of the mandrel and over the unidirectional ply to form an angle or bias ply. Depending upon the angular orientation desired between the fibers of the unidirectional ply and the angle ply, multiple wrapping of the one inch wide ribbon may be required to produce a continuous, uninterrupted wrapping of first angle ply fibers. The mandrel may then be wrapped with another similar or second angle ribbon of the same fibers around the circumference of the mandrel, obliquely over the fibers of the unidirectional ply, and transversely over the above described angle ply to form a second angle ply. Preferably the first and second angle ply fibers are perpendicular to each other at +45° and −45°. An epoxy resin and a versamide catalyst are then coated or spread uniformly over the plies. Then the mandrel is removed while the resin is in the uncured state. The resulting tube of impregnated fibers is next collapsed to a flat, eight inch wide tape having one or more of the inch wide unidirectional plies in its center. A collapsed tube forming the tape is illustrated in cross-section in FIG. 11. In the embodiment of this figure the tape has a single ply I of unidirectional fibers sandwiched between (+) and (−) angle plies II and III which are formed respectively from the two collapsed, flattened fiber tubes formed by winding the fibers as described above. As illustrated, the flattened fiber tube forming plies II is located within the flattened fiber tube forming plies III and ply I is located within the flattened inner fiber tube and is centered between the edges of the two flattened fiber tubes forming plies II and III. In FIG. 11 the resin and catalyst coating is not illustrated and some of the layers are shown separated for purposes of clarity. The flat tape is placed on a nine inch wide polyethylene film or sheet and stored at a temperature of zero degrees or less for a period of at least 2 hours to harden. Such tapes may thereafter be removed from cold storage and placed in a selected pattern on a form of selected geometry after removing the film. The described resin or matrix liquifies at room temperature andd then cures into a composite solid.

Although the tape of FIG. 11 was described as being made from fiberglass it could be made instead from graphite. It is to be understood that other processes may be employed to form a tape having three plies for example as illustrated in FIG. 7 from which the structural member 27 is formed. By the use of suitable processes such tape may be formed of fiberglass, graphite or boron as indicated above.

In the construction of a warehouse cart shown in FIG. 1, the floor 13 and walls 15 are formed with the previously described eight inch wide tapes. A form (not shown) having an exterior surface identical to the interior surface of the cart 11 is used for placement of three such tapes. Two of the tapes 53, 55 are shown partially in FIG. 2, joining each other along an imaginary dotted line 57. Each tape has a unidirectional ply 59, 61. Further, each tape has angle or bias plies (not shown) as explained previously. Tape 55 has a folded portion 63. Beneath the adjacent edges 57 of tapes 53 and 55 is another eight inch wide tape 65, having a unidirectional ply 67 and angle plies forming the remainder of its width. Tape 65 overlaps along each outer edge a transverse portion 69 of a beam 71.

As shown in FIG. 3, beam 71 preferably has plural layers of unidirectional fibers 73, 75 that form ply I; an angle ply II of fibers 77 and matrix; and another angle ply III of fibers 79 and matrix. Plies I, II and III are formed by the method previously described to form tapes that are taken from cold storage and shaped around a form having an exterior geometry that matches interior surface 81 of the beam. Before curing, the angle plies II and III may be easily folded to form, without wrinkling. Upon curing, the beam thus has a truss cap and shear webs that cooperate to enable the support of relatively large forces and stresses.

Four of the beams 71 are aligned as shown in FIGS. 1 and 2. Tape 65 has a portion 83 on each of its sides that overlaps a transverse portion 69 of the beam 71. The folded portion 63 of each tape 55 overlaps the transverse portion 85 of each outer beam 71 as shown. Thus, when bonded to each other by the cured matrix, a strong and lightweight structure is formed. The shelf 17 is formed in a similar manner and provides additional bracing for the structure.

Figure 8:
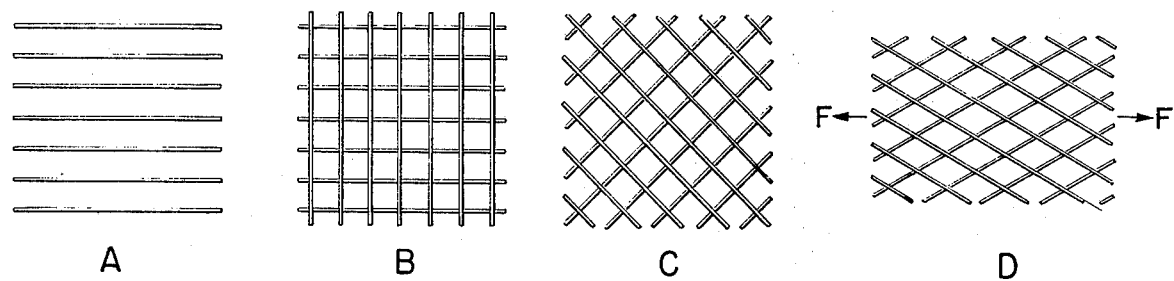
FIG. 8 is a schematic view illustrating fiber orientations to facilitate explanation of the principles of the invention.

The advantages of the invention may be better understood with reference to FIG. 8, wherein A shows unidirectional fibers and B shows perpendicular fibers, both of these fibers orientations displaying great axial strength and stiffness, but little elongation ability for compound curvature. Such fiber orientations are suitable for use along the longitudinal axis of a structural member to form a truss cap. Fibers oriented as illustrated in FIGS. C and D display good shear strength and elongation capability in an oblique direction but low strength in the oblique direction. An axial force F applied to the tape configuration in C will deform as shown in D. For this reason the oblique or angle plies II and III in FIG. 7 may be stretched or contracted prior to curing into a desired configuration without forming wrinkles. When cured, a strong beam of the Warren type results, but with multiple, nonintersecting diagonal member.

Figure 9:
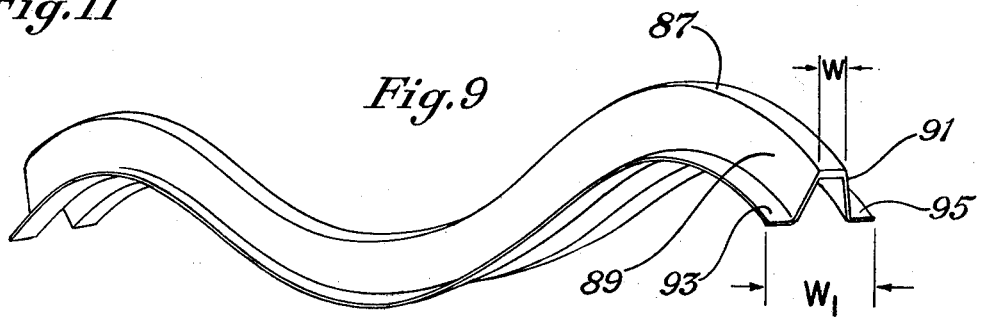
FIG. 9 is an alternate structural member constructed in accordance with the principles of the invention.

As shown in FIG. 9, and for the reasons previously explained, ply I of the FIG. 3 structure may be used to form the upper surface 87 of a beam of complex shape having a truss cap of width W. The angle plies Ii and III are used to form shear webs 89 and 91 and lateral extension 93 and 95 extending to a total width $W_1$. These extensions are excess width of ply used for attachment to other structural members. Since the fibers of the angle plies permit extensive diagonal stretch as shown in C and D of FIG. 8, complex curvatures such as shown in FIG. 9 are easily formed prior to curing the matrix without forming wrinkles in the tape.

Figure 10:
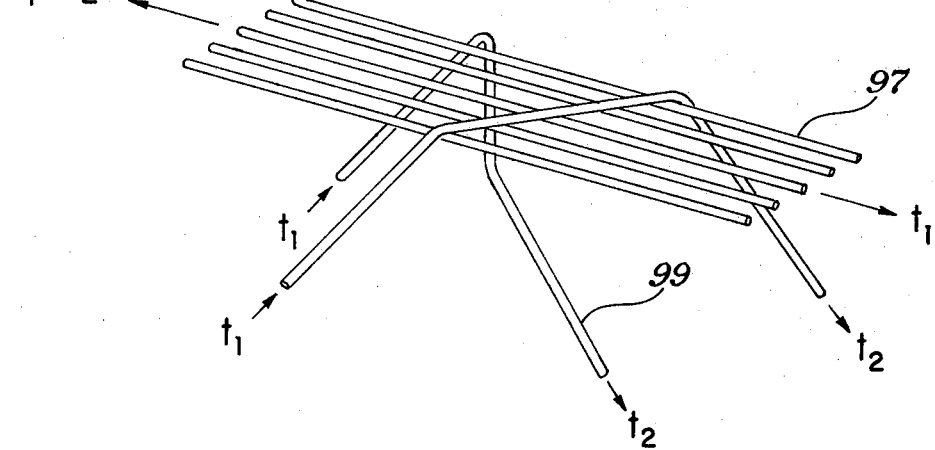
FIG. 10 is a fragmentary enlarged perspective view of unidirectional and oblique fibers without matrix to further facilitate explanation of the invention.

The individual fibers of the angle plies transmit their load $t_1$ and $t_2$ through the matrix to the longitudinal fibers 97 as shown in FIG. 10. It is this intimate relationship between the fibers 99 of the wide angle ply material and those of the relatively narrow longitudinal ply that assures adequate load transfer capability in spite of the curvature of the angle ply fibers.

While the invention has been shown in only one of its forms, it should be apparent to those skilled in the art that it is not so limited but is susceptible to various changes and modifications without departing from the spirit thereof.

I claim:

1. A flexible plied filamentary tape of a given width for use for constructing a load bearing member, said tape being formed of fibers pre-aligned to carry the various loads within the load bearing member and comprising:

a first ply of unidirectional fibers extending along the length of said tape, a first flattened tube-shaped member extending along the length of said tape and whose flattened sides define a first pair of angle plies in the plane of said tape and which are formed of fibers that extend transversely to each other respectively and oblique to the fibers of said first ply, a second flattened tube-shaped member extending along the length of said tape and whose flattened sides define a second pair of angle plies in the plane of said tape and which are formed of fibers that extend transversely to each other respectively and oblique to the fibers of said first ply, the width of said second tube-shaped member, as seen in a transverse cross-section of said tape, being slightly greater than the width of said first flattened tube-shaped member and defining said given width of said tape, said first flattened tube-shaped member being located within said second flattened tube-shaped member with said first pair of angle plies being located close to said second pair of angle plies respectively, the fibers of adjacent plies of said first and second pair of angle plies extending transversely to each other, said first ply having a width substantially less than the widths of said first and second flattened tube-shaped members and being centered between the edges of said first and second flattened tube-shaped members, said fibers being selected from the class consisting of fiberglass, graphite and boron, and said fibers being held together by a resin in the uncured state suitable for subsequent hardening.

2. The tape of claim 1 wherein:
    said first ply is located within said first flattened tube-shaped member.

3. The tape of claim 1 wherein:
    said first flattened tube-shaped member comprises continuous fibers wound obliquely in a first direction relative to the direction of the fibers of said first ply,
    said second flattened tube-shaped member comprises continuous fibers wound around said fibers of said first flattened tube-shaped member,
    said fibers of said second flattened tube-shaped member being wound obliquely relative to the direction of the fibers of said first ply and in a direction opposite said first direction.

4. The tape of claim 3 wherein:
    said first ply is located within said first flattened tube-shaped member.

* * * * *